Aug. 16, 1966   J. M. CLAPP ET AL   3,266,580
FLUID-OPERATED ROTATING AND RECIPROCATING TOOL
Filed Jan. 27, 1964   4 Sheets-Sheet 1
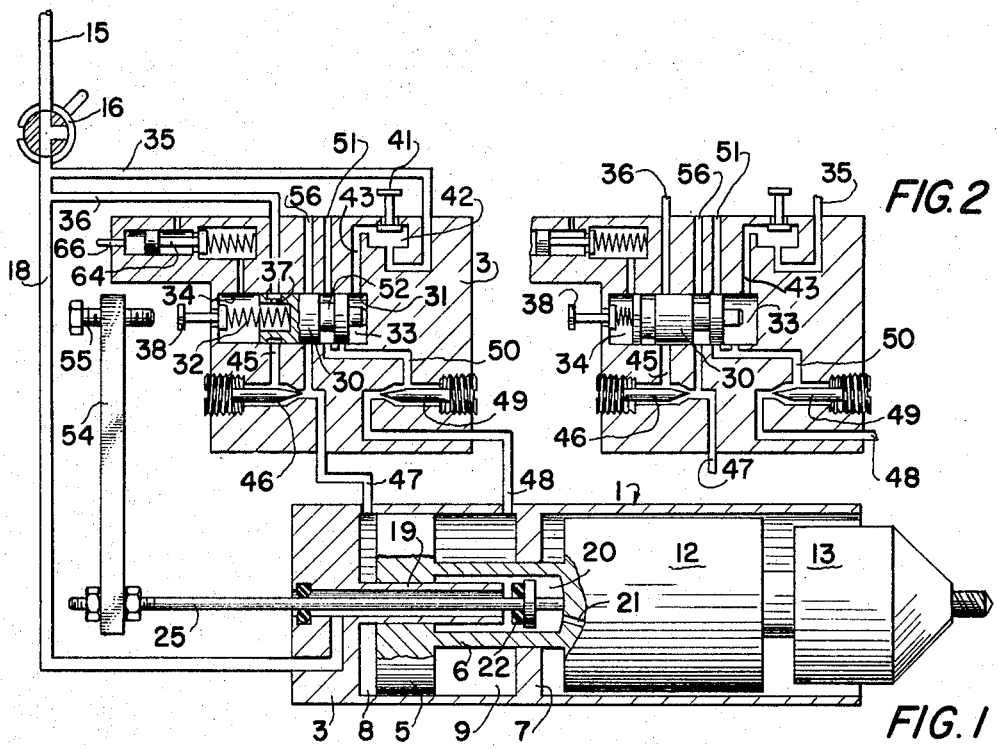
FIG. 2
FIG. 1
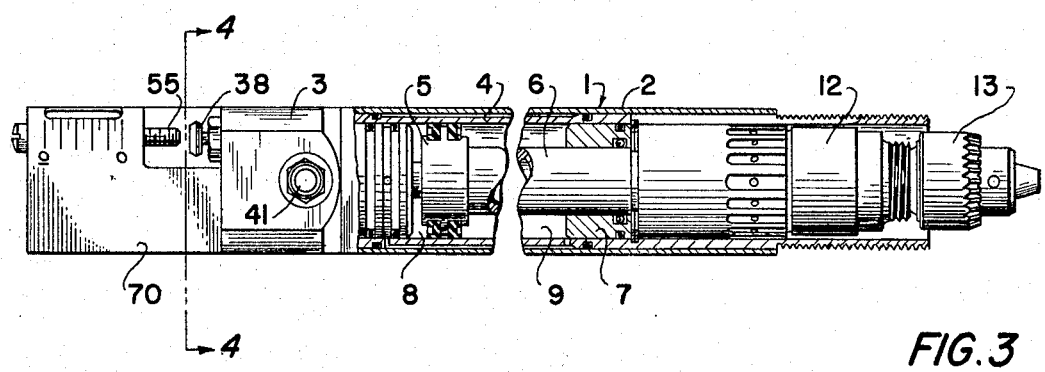
FIG. 3
INVENTORS
JOHN M. CLAPP
EMANUEL G. SPYRIDAKIS
BY
David W. Tibbott
THEIR ATTORNEY

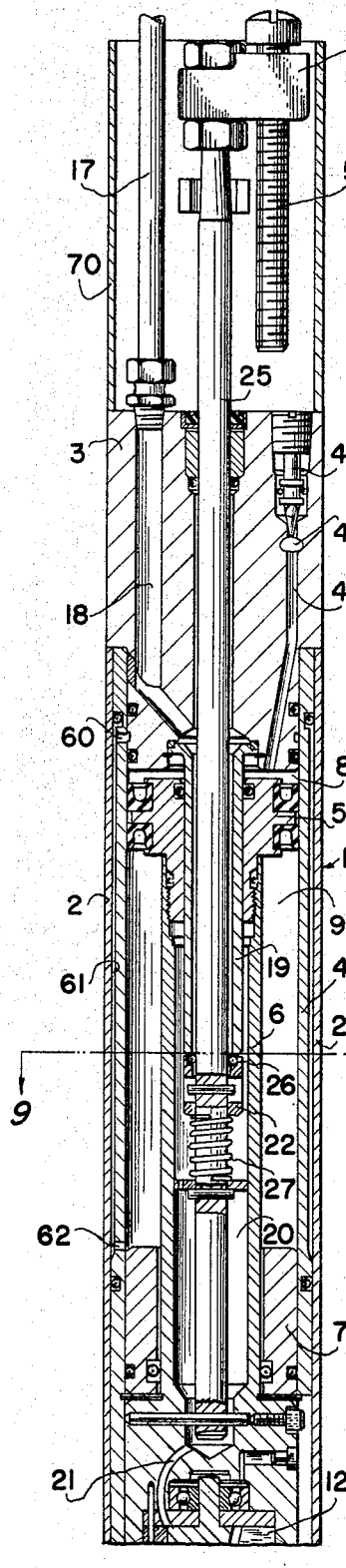

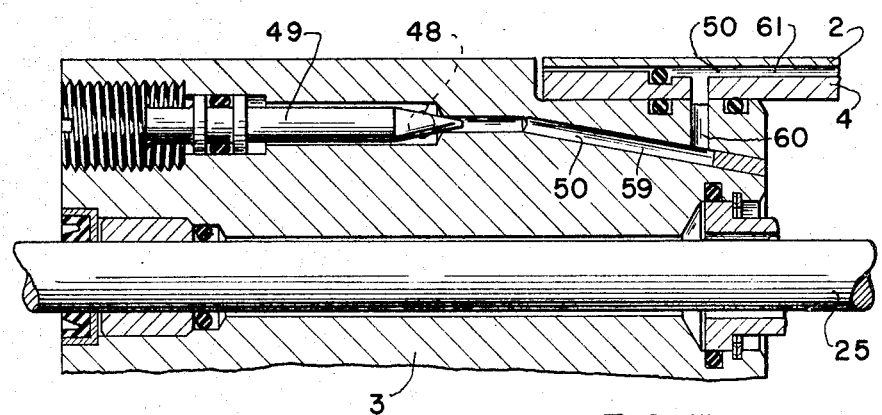
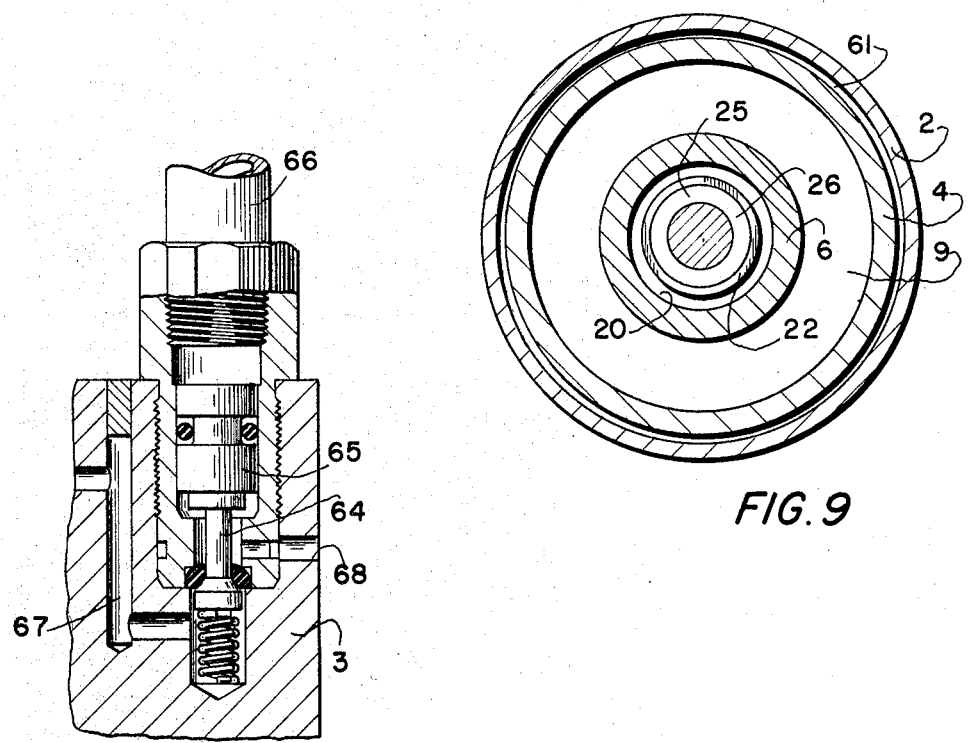

Aug. 16, 1966    J. M. CLAPP ET AL    3,266,580
FLUID-OPERATED ROTATING AND RECIPROCATING TOOL
Filed Jan. 27, 1964    4 Sheets-Sheet 4

INVENTORS
JOHN M. CLAPP
EMANUEL G. SPYRIDAKIS
BY
David W. Tibbott
ATTORNEY

United States Patent Office 3,266,580
Patented August 16, 1966

3,266,580
FLUID-OPERATED ROTATING AND
RECIPROCATING TOOL
John M. Clapp and Emanuel G. Spyridakis, Athens, Pa.,
assignors to Ingersoll-Rand Company, New York, N.Y.,
a corporation of New Jersey
Filed Jan. 27, 1964, Ser. No. 341,486
18 Claims. (Cl. 173—19)

This invention relates to fluid pressure operated tools which simultaneously rotate and axially reciprocate a tool such as a drill bit. This application is a continuation-in-part of our application Serial No. 201,852, filed June 12, 1962, now abandoned.

Pneumatically-operated drills having both rotary and axially reciprocating movements are termed "air feed drills." Examples of prior art air feed drills are disclosed by the patents of Taylor, 2,674,098, Robinson, 2,857,789, and De Groff, 2,860,531. Conventional air feed drills have several objectionable features or characteristics. For example they are usually heavy and bulky which makes them undesirable for portable use. Another undesirable feature of conventional air feed drills is that they usually stop their rotary movement during the retraction of the drill bit; such stoppage of the drill bit causes it to cut grooves in the sides of its hole as it is retracted. Still another objection to conventional air feed drills is that when they are controlled from remote locations, they require at least three air hoses running between the drill and the control station which clutter up the space around the drill and increase the labor of getting it ready for operation.

The principal object of this invention is to provide an improved tool which overcomes or substantially minimizes the objectionable features of prior art air feed drills.

Other important objects of the invention are: to provide an improved tool which is substantially lighter in weight and less bulky than prior art air feed drills; to provide an air feed drill which continues to rotate a drill bit as it is retracted from a hole; to provide an air feed drill which can be controlled from a remote station using only a single hose running between the control station and the drill; to provide an air feed drill which automatically begins its rotary movement as its reciprocating movement begins and ends its rotary movement at the end of its reciprocation; and to provide an air feed drill which can be triggered to begin another cycle merely by momentarily interrupting its air supply.

In general, certain objects of this invention are attained by feeding fluid pressure to the rotary motor of the air feed drill along a motor fluid passage extending through the back head of the tool body and the piston carrying the rotary motor and by mounting a valve on the piston in such a way that it closes the motor fluid passage when the piston and motor are fully retracted. Thus, the fluid pressure is automatically fed to the motor as the forward feed stroke of the piston begins and the fluid pressure is automatically shut off from the motor at the end of the return stroke of the piston.

Other objects of the invention are provided by operating the tool feeding piston by means of a spool valve which is operative in a first position to cause the piston to make its forward stroke and operative in its second position to cause the piston to make its return stroke, arranging pressure chambers at each end of the spool valve so that one chamber can be exhausted to cause the pressure in the other chamber to move the spool valve from its first position to its second position and by spring-biasing the spool to its first position so that it can be actuated back to its first position merely by momentarily shutting off the fluid pressure feeding the tool. This arrangement allows the tool to be recycled using the same fluid supply hose that supplies the tool with its operating fluid pressure, and thus allows the tool to be controlled from a remote station using only a single fluid pressure supply hose running to the tool.

The invention is illustrated in the accompanying drawings wherein:

FIG. 1 is a diagrammatic view of the fluid control system of an air feed drill incorporating the features of this invention;

FIG. 2 is a fragment of FIG. 1 showing the spool valve of the fluid control system in its alternate position;

FIG. 3 is a broken and cut-away elevational view of the air feed drill of this invention;

FIG. 4 is an enlarged section taken on line 4—4 in FIG. 3 and having portions cut-away;

FIG. 5 is a longitudinal section of the rear half of the air feed drill;

FIG. 6 is a fragmentary section taken along the line 6—6 in FIG. 4;

FIG. 7 is a fragmentary section taken along the line 7—7 of FIG. 4;

FIG. 8 is a fragmentary section taken along the line 8—8 in FIG. 4;

FIG. 9 is an enlarged section taken along the line 9—9 of FIG. 5;

Figure 10:
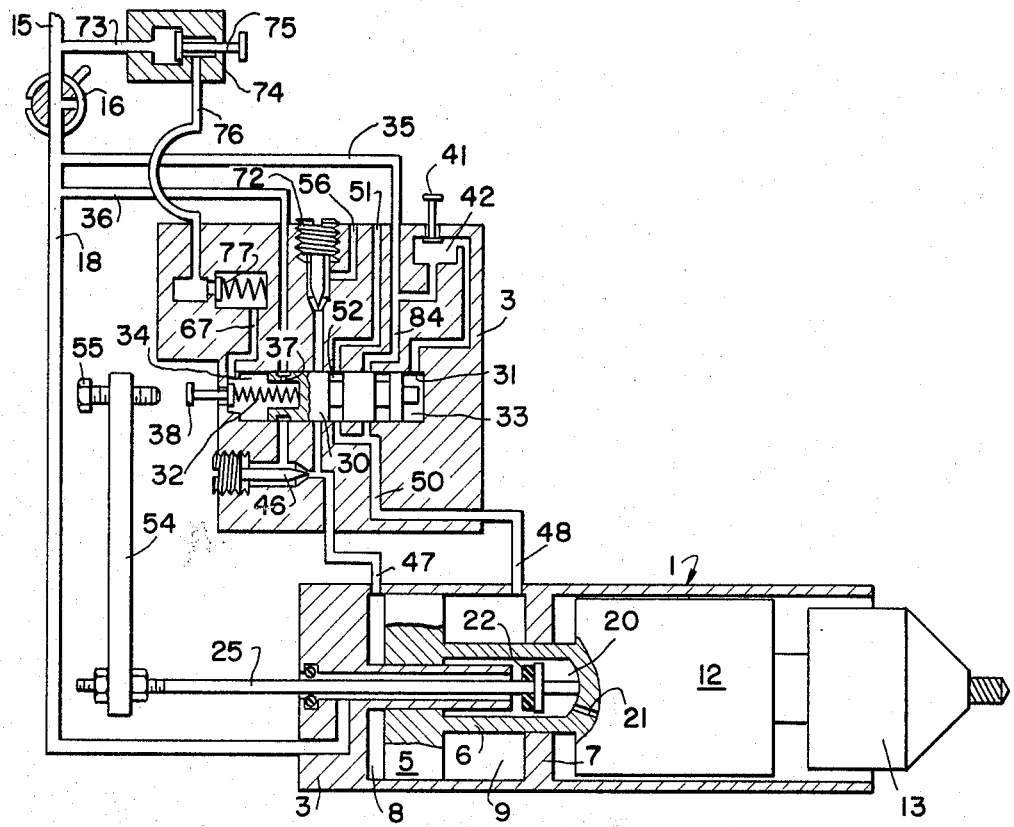
FIG. 10 is a schematic view similar to FIG. 1 of another embodiment wherein the adjustable needle valves are rearranged.

The air feed drill shown in the drawings comprises a body 1 which is formed by an outer elongate cylinder 2 which is open at its front end and closed at its rear end by a back head 3. An inner cylinder 4 nests in the outer cylinder 2, as seen in FIGS. 3 and 5, is closed at its rear end by the back head 3 and projects forwardly from the front end of the outer cylinder 2. A piston 5 is axially slidable in the inner cylinder 4 and includes a piston rod 6 which extends forwardly from the piston 5 through an annular ring 7 which is locked in the inner cylinder 4 about midway between its ends.

The foregoing structural arrangement forms two fluid-receiving chambers which are separated by the piston 5 and one adapted to alternately receive fluid pressure, such as pneumatic pressure, for feeding the piston 5 in alternate directions in the inner cylinder 4. The chamber located rearwardly of the piston 5 is designated the forward feed chamber 8 and the chamber located in front of the piston 5 is designated the retraction chamber 9.

The front end of the piston rod 6 is fixed to the rear end of a conventional vane-type air motor 12 which is slidably mounted in the front half of the inner cylinder 4. The air motor 12 carries a conventional drill chuck 13 projecting forwardly from the front end of the body 1. Normally, the drill chuck is driven through a set of planetary gears (not shown) which are located between the air motor 12 and the drill chuck 13 and reduce the rotary speed of the air motor 12 to a suitable value for driving the chuck 13. No attempt is made to describe the air motor and drill chuck further since these items are conventional and well known in the air feed drill art, as shown by the patents to Taylor, 2,674,098, Robinson, 2,857,789, and De Groff, 2,860,531.

From the foregoing, it will be obvious that the air motor 12 rotates its drill chuck 13 while the piston 5 axially feeds the motor 12 and chuck 13 through a reciprocatory cycle during a work operation. This reciprocatory cycle begins and terminates with piston 5 resting at the rear end of its travel path and includes a forward stroke followed by a return stroke.

MOTOR FLUID CIRCUIT

A simplified version of this circuit is shown in FIG. 1. In general, it includes a fluid pressure source (not shown) feeding a main line 15 connected to a conventional three-way valve 16. The valve 16 is connected by a hose 17 (shown in FIG. 5) to a fluid inlet passage 18 in the back head 3. The inlet passage 18 opens into a tube 19 which is fixed on the front of the back head 3 and extends forwardly through the piston 5 and the piston rod 6. The piston rod 6 is hollow and forms a central rod passage 20 which opens at its front end into the fluid inlet 21 of the air motor 12.

Access of the fluid pressure from the tube 19 into the central rod passage 20 in the piston rod 6 is determined by a motor valve 22 which is mounted in the central rod passage 20 and is located to seat on and close the front end of the tube 19 when the piston 5 is fully retracted. As the piston 5 starts its forward stroke, as shown in FIG. 1, the motor valve 22 is lifted off the front end of the fixed tube 19 and the fluid pressure in the tube 19 is free to flow into the rod passage 20 to the air motor 12, thereby driving the motor and its chuck 13. This driving of the motor 12 continues throughout the remainder of the cycle and is only stopped when the piston 5 returns and seats the motor valve 22 once again on the front end of the fixed tube 19.

The specific construction and mounting of the motor valve 22 is shown in FIG. 5. A follower rod 25 is anchored at its front end to the front end of the piston rod 6 and extends axially rearwardly through the central rod passage 20, the fixed tube 19 and slidably through the back head 3 to project behind the back head a substantial distance. This follower rod 25 is smaller than the rod passage 20 and the interior of the fixed tube 19 so that fluid may pass therebetween. Suitable seals circle the follower rod 25 at the rear of the back head 3 to prevent the pressure fluid from leaking rearwardly from the fixed tube 19.

The motor valve 22 carries a resilient rear face 26 adapted to seat on the front end of the fixed tube, is slidably mounted on the follower rod 25 for limited movement and is spring-biased rearwardly by a spring 27 which is anchored at its front end to the follower rod 25. This arrangement insures that the motor valve 22 is firmly seated against the tube 19 when the piston 5 is retracted and compensates for any variation between the piston's position when it is fully retracted and the piston's position when the motor valve 22 is seated.

PISTON FLUID CIRCUIT

FIG. 1 shows a portion of the back head 3 separate from the body 1 to simplify the illustration of the fluid circuits of the tool. It will be understood that FIG. 1 is merely a diagrammatic view and does not show the true construction or location of the back head 3 and its associated elements.

The back head 3 is provided with a two-position spool valve 30 which slides in a bore 31 formed in the back head 3. In one position, its front position, the spool valve 30 simultaneously feeds fluid pressure to the forward feed chamber 8 and exhausts the retraction chamber 9 to drive the piston 5 on its forward stroke. In the other position, its rear position, the spool valve 30 simultaneously feeds pressure fluid to the retraction chamber 9 and exhausts the forward feed chamber 8 to drive the piston 5 rearwardly through its return stroke.

The spool valve 30 is biased forwardly in the bore 31 by a spring 32. When the spool valve 30 is in its forward position, as shown in FIG. 1, the front and rear chambers 33 and 34 located at the opposite ends of the valve 30 are in communication with the fluid pressure in the inlet passage 18 by means of the intermediate passages 35 and 36. The front intermediate passage 35 communicates with the front chamber 33 through a valve 41 and the rear intermediate passage 36 communicates with the rear chamber 34 by means of several small ports 37 in the spool valve 30.

When the spool valve 30 is in its forward position, the admission of fluid pressure into the inlet passage 18 results in simultaneous admission of fluid pressure to both the front and rear chambers 33 and 34 of the valve, which prevents the creation of a differential pressure between the two chambers 33 and 34. Hence, the spool valve 30 remains in its forward position. The spring 32 normally moves and holds the spool valve 30 in its forward position when the fluid pressure is closed off from the tool.

After fluid pressure is admitted to both the front and rear valve chambers 33 and 34, the spool valve 30 is moved to its rear position by venting the rear chamber 34, thus creating a pressure differential between the two valve chambers tending to drive the valve rearwardly. This venting of the rear chamber 34 is accomplished by pushing inwardly on the poppet valve 38 located at the rear end of the bore 31 and projecting from the rear end of the back head 3. The poppet valve 38 is loosely mounted in its guide hole 39 so that when its head 40 is pushed inwardly off its seat, the fluid pressure in the rear chamber 34 freely escapes to the atmosphere along the clearance space between the valve stem and its guide hole. The poppet valve 38 is termed a reversing poppet valve since it actuates the spool valve 30 to its rear position, causing the piston 5 to move along its return stroke.

When the spool valve 30 is in its rear position, it is moved back to its forward position by exhausting the front valve chamber 33, allowing the spring 32 to drive the spool valve 30 forward. Exhausting the front chamber 33 may be accomplished by momentarily shutting off the fluid pressure to the tool and exhausting the inlet passage 18 by means of the conventional three-way valve 16 shown in FIG. 1.

Exhausting the front valve chamber 33 may also be accomplished by a poppet valve 41, which is located on the side of the back head 3. The poppet valve 41 is similar to the poppet valve 38 and is mounted in the back head to reciprocate in a cavity 42 which communicates with the chamber 33 through a passage 43. When the valve 41 is depressed, it simultaneously plugs the end of the passage 35, opening into the cavity 42, and exhausts the cavity 42 which is in communication with the front chamber 33 through the passage 43. The poppet valve 41 is termed a manual recycle valve since it can be used to cause the tool to begin a cycle, as will be clear later.

Forward feed piston stroke

When the spool valve 30 is in its forward position as shown in FIG. 1, it allows pressure fluid to flow from the rear intermediate passage to a forward stroke passage 45 running to a forward stroke needle valve 46. The needle valve 46 meters or adjustably limits the fluid pressure and dumps it into a passage 47 leading into the forward feed chamber 8. Also, in the forward position of the spool valve, the retraction chamber 9 is exhausted through a passage 48 leading to a retraction needle valve 49. The needle valve 49 is connected to a retraction passage 50 which is in communication with a vent passage 51 by means of a peripheral groove 52 in the spool valve 30. The needle valves 46 and 49 can be adjusted to control and limit the fluid pressure flowing into and from the two piston chambers 8 and 9 to control the speed of the forward and return strokes of the piston 5.

*Return piston stroke*

The follower rod 25 extending from the rear of the back head 3 carries at its rear end a bracket 54 containing a threaded bolt 55. As the piston 5 carries the follower rod 25 forwardly during the forward stroke of the piston, the bolt 55 eventually strikes and depresses the reversing poppet valve 38. The point in the forward stroke at which the reversing poppet valve 38 is depressed can be varied merely by adjusting the threaded bolt 55. Hence, the length of the forward piston stroke is adjusted by means of the bolt 55.

As previously explained, the depression of the reversing poppet valve 38 exhaust the rear valve chamber 34 to create a pressure differential between the front and rear valve chambers 33 and 34 and cause the spool valve to move to its rear position.

When the spool valve 30 is in its rear position as shown in FIG. 2, it closes the vent passage 51 and allows fluid pressure to flow from the front valve chamber 33 to the retraction passage 50 past the retraction needle valve 49 and into the passage 48 leading to the retraction piston chamber 9. Simultaneously, fluid pressure is exhausted from the forward feed chamber 8 via the passage 47. The passage 47 is placed in communication with the vent passage 56 by the peripheral groove 52 on the spool valve 30.

It will be noted that with the spool valve 30 in its rear position, it closes off the rear intermediate passage 36 with the forward stroke passage 45, and the exhaust of the forward feed piston chamber 8 bypasses and is not metered by the forward stroke needle valve 46. This expedient allows the return stroke of the piston 5 to be much more rapid that its forward feed stroke.

When the piston 5 reaches the end of its return stroke, it stops and remains in that position so long as the spool valve 30 remains in its rear position, as shown in FIG. 2. The spool valve 30 will remain in its rear position so long as fluid pressure is maintained in the front valve chamber 33.

In order to recycle or start another cycle of the tool, the front valve chamber 33 is exhausted using either the three-way valve 16 or the manual recycle poppet valve 41, as previously explained. The manual recycle poppet valve 41 is normally used when the operator is using the drill by itself, instead of in a gang of tools. When the tools are used in a gang, they are usually controlled by the valve 16 which momentarily shuts off the fluid pressure to the tools and exhausts the feeding hoses 17 leading from the valve 16 to the individual tools. This feature of being able to recycle the tools simply by interrupting the fluid pressure supply is highly desirable as it enables the use of only one hose for both supplying fluid pressure to and controlling the tools.

The specific formation of the passage 48 running between the retraction piston chamber 9 and the retraction needle valve 49 is shown in FIGS. 5 and 7. FIG. 7 shows a longitudinal passage 59 running from the needle valve 49 to a radial port 60 which opens into the annular space 61 located between the outer and inner cylinders 2 and 4. The annular space 61 is connected to the retraction piston chamber 9 by a second radial port 62 located at the front of the retraction chamber 9.

OPERATION

Prior to the start of operation of the air feed drill, and prior to the admission of fluid pressure to it, the piston 5 is located at the rear end of its reciprocatory travel path and the spool valve 30 is resting in its forward position. Since the piston 5 is in its rearmost position, the motor valve 22 in the piston rod passage 20 is seated on and closes the fixed tube 19 extending axially forward from the back head 3.

Fluid pressure is fed to the tool simply by turning the valve 16 to the position shown in FIG. 1, thus introducing fluid pressure into the inlet passage 18 in the back head 3. This fluid pressure is simultaneously fed to both the front and rear chambers 33 and 34 of the spool valve 30, via the intermediate passages 35 and 36, causing the spool valve 30 to remain in its forward position.

In the forward position of the spool valve 30, the fluid pressure flows from the rear intermediate passage 36 past the spool valve 30 and into the forward stroke passage 45. The passage 45 dumps the fluid pressure into the forward stroke needle valve 46 which meters it and feeds it via the passage 47 into the forward feed piston chamber 8, resulting in the piston 5 being driven forward on its forward stroke. Also, in its forward position, the spool valve 30 exhausts the retraction piston chamber 9 along a path including the passage 48, the retraction needle valve 49, the retraction passage 50, the peripheral groove 52 in the spool valve 30, and the vent passage 51.

During the initial portion of the forward stroke of the piston 5, the motor valve 22 is lifted off the end of the fixed tube 19 to allow fluid pressure to flow to the motor 12, which begins to drive the chuck 13 and whatever tool bit it may be holding. Hence, the chuck 13 is simultaneously rotated and fed axially forward on its forward stroke. The speed of the forward stroke may be controlled by adjusting the needle valves 46 and 49.

As the piston 5 moves on its forward stroke, the follower rod 25 carries the threaded bolt 55 forward until it eventually engages and depresses the reversing poppet valve 38. Depression of the valve 38 vents the rear chamber 34 of the spool valve 30 causing the pressure in the forward valve chamber 33 to drive the spool valve 30 to its rear position, as shown in FIG. 2.

In the rear position of the spool valve 30, it blocks off the vent passage 51 and feeds fluid pressure from the front valve chamber 33 to the retraction passage 50 and past the retraction needle valve 49. The needle valve 49 meters and dumps the fluid pressure into the passage 48 which conveys it to the retraction piston chamber 9, causing the piston 5 to reverse its movement and to begin its return stroke. Simultaneously, the forward feed chamber 8 of the piston 5 is exhausted to atmosphere via the passage 47, the peripheral groove 52 in the spool valve 30 and the vent passage 56. The rotary motor 12 continues to rotate the chuck 13 during the return stroke of the piston 5.

As the piston 5 stops at the rear end of its return stroke, the motor valve 22 seats on and closes the front of the fixed tube 19 thus shutting off fluid pressure to the rotary motor 12 and stopping its operation. The spool valve 30 will thereafter remain in its rear position until it is desired to recycle the tool for another operation.

Recycling the tool can be accomplished in either of two ways, by depressing the manual recycle poppet valve 41 or by momentarily closing off the fluid pressure from the tool by operating the three-way valve 16. The use of either of these expedients results in the exhaust of fluid pressure from the front valve chamber 33, thus allowing the spring 32 to drive the spool valve 30 back to its forward position. Thereafter, when fluid pressure is again admitted to the tool by manipulating the three-way valve 16 or by closing the recycle poppet valve 41, the tool begins another forward stroke. The following operation of the cycle is identical with the description of the operation of the preceding cycle.

MISCELLANEOUS STRUCTURE

In some cases, it may be desirable to actuate the spool valve 30 to its rear position, to cause the piston to begin its return stroke, from a remote station. This is accomplished by the fluid-actuated poppet valve 64 shown in FIG. 8. This valve 64 includes a piston 65 sliding in a bore in the back head 3 and adapted to be connected to a control station by the hose 66. The poppet valve 64 operates like the other poppet valves 38 and 41 and is connected to the rear valve chamber 34 of the spool valve 30 by a passage 67. When the valve 64 is depressed by the application of fluid pressure through the hose 66 to its piston 65, it exhausts the passage 67 to atmosphere through the vent passage 68.

The projecting portion of the follower rod 25 and the bolt 55 which operates the reversing poppet valve 38 are surrounded and substantially enclosed within a sleeve-like guard 70 to prevent an operator from being accidentally injured by these moving parts.

ADDITIONAL EMBODIMENTS

The embodiment shown in FIG. 10 differs from the FIG. 1 embodiment by the elimination of the retraction needle valve 49. As a result, the fluid, flowing into or from the retraction chamber 9 is not metered or limited by a needle valve. Instead, fluid flowing into and from the forward feed chamber 8 is metered or limited by needle valves. The embodiment of FIG. 1 controls and adjustably limits fluid flowing into the chamber 8, by needle valve 46, but does not adjustably limit fluid flowing out of the chamber 8.

The embodiment of FIG. 10 contains a needle valve 72 in the vent passage 56 for adjustably controlling fluid being exhausted from the forward feed chamber 8. Hence, the needle valve 72 is adjustable to vary and control the speed of the return stroke of the piston 5. The advantage of this embodiment is that the speed of the forward stroke of the piston 5 is not affected or obstructed by the adjustment of the retraction needle valve 72. In FIG. 1, the speed of the forward stroke of the piston 5 can be affected and changed by the adjustment of the retraction needle valve 49.

Another difference in the embodiment of FIG. 10 is the provision of a separate fluid circuit for recycling the drill. This circuit includes a hose 73 connected to the main pressure line 15 ahead of the three-way valve 16. The hose 73 feeds pressure to a push button valve 74 containing a poppet 75 adapted to be manually opened by an operator pushing it inward. When released by the operator, it automatically closes as a result of the fluid pressure in the hose 73.

When opened, the valve 74 feeds pressure to the hose 76 connected between the valve 74 and the back head 3. After reaching the back head 3, the fluid passes a check valve 77 and flows through the passage 67 to the rear valve chamber 34, causing the spool valve 30 to be returned to its front position, shown in FIG. 10.

The push button valve 74 is used to start the drill on a new cycle after it has finished a previous cycle and the piston 5 returns to its rear position. In this position, the spool valve 30 is held in its rear position, shown in FIG. 2, as a result of the rear chamber 34 being exhausted. Opening the valve 74 again pressurizes the rear chamber 34 to counterbalance the pressure in the front chamber 33 of the spool valve 30 whereupon the spring 32 forces the spool valve 30 back to its forward position.

The separate recycling fluid circuit will be used when it is desired to recycle the drill from a remote station without exhausting the inlet passage 18 by operating the three-way valve 16.

Figure 11:
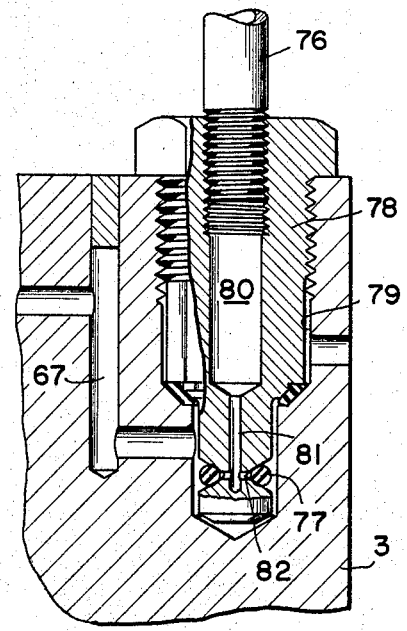
FIG. 11 is a sectional view similar to FIG. 8 showing an accessory which can be used in the embodiment shown in FIG. 10 to provide a separate fluid pressure circuit for triggering the drill to start another cycle.

FIG. 11 illustrates the connection of the hose 76 to the back head 3 in place of the poppet valve 64 shown in FIG. 8. A threaded fitting 78 is screwed into the bore 79 in place of the valve 64 and the hose 76 is threaded into the interior of the fitting 78. The fitting 78 contains a cavity 80 adapted to receive fluid pressure from the hose 76 and a dead-end passage 81 located in the front of the fitting 78 and leading from the cavity 80. A pair of diametrical ports 82 open outward from the passage 81 and are closed by a resilient ring 77 which acts as a check valve for the ports 80. The ring 77 resiliently embraces the fitting 78 and seats in an annular groove on the periphery of the fitting 78 which prevents its displacement. The ring 77 readily opens to allow pressure fluid to travel from the ports 82 to the passage 67 while preventing the flow of fluid in the opposite direction.

Another change in FIG. 10 over the embodiment of FIG. 1 is the addition of a by-pass passage 84 extending from the front intermediate passage 35 and by-passing the chamber 42 of the manual recycle poppet valve 41. The passage 84 is closed with the spool valve 30 in its forward position, as shown in FIG. 10. When the spool valve 30 is in its rear position, the by-pass passage 84 is opened and connected to the retraction passage 50 for feeding pressure fluid to the retraction piston chamber 9.

This arrangement isolates the front valve chamber 33 from the passage 50 when the spool valve 30 is in its rear position. As a result, the manual recycle poppet valve 41 needs to only exhaust a small volume, mainly chambers 33 and 42, to reduce the fluid pressure sufficiently for the spool valve 30 to move forward. In FIG. 1, the chamber 33 is connected to the retraction passage 50 when the spool valve 30 is in its rear position and, as a result, the poppet valve 41 has to exhaust a greater volume of fluid before the spool valve 30 moves forward. Since the volume which has to be exhausted in FIG. 10 is less, the FIG. 10 embodiment speeds up the action of the poppet valve 41 in moving the spool valve 30 forward. In other words, the embodiment of FIG. 10 minimizes any lag between the depression of the poppet valve 41 and the forward movement of the spool valve 30.

Although several preferred embodiments of the invention have been illustrated and described in detail, it will be understood that the invention contemplates other embodiments and variations of the basic invention. For example, the piston 5 can be retracted by use of a spring located in front of the piston instead of by means of fluid pressure. Furthermore, the novel valving arrangement for the fluid motor 12 can be used with other piston driving means or piston controlling structure. Also, the novel piston control valve structure can be used in combination with other types of fluid feeding circuits for the rotary motor 12.

Having described our invention, we claim:
1. A fluid-operated tool for rotating and axially reciprocating a tool implement, said tool comprising:
 (a) a body;
 (b) a fluid-operated rotary motor mounted in said body for axial reciprocating movements;
 (c) a tool spindle connected to said rotary motor for rotation thereof;
 (d) tool feeding means in said body for feeding said rotary motor and spindle forwardly through a forward stroke and then retracting it rearwardly through a return stroke;
 (e) a fluid pressure source; and
 (f) first valve means operative, in response to the starting movement of said rotary motor along its forward stroke, to open and connect said fluid pressure source to said rotary motor for driving it;
 (g) said first valve means remaining open for driving said rotary motor throughout the forward and return strokes of said rotary motor.

2. The fluid-operated tool of claim 1 wherein:
 (a) said first valve means is operative, in response to the rotary motor reaching the end of its return stroke, to shut off said fluid pressure source from said rotary motor and thereby stop said motor.

3. The fluid-operated tool of claim 1 wherein said tool feeding means includes:
(a) a piston reciprocating in said body and connected to said rotary motor; and
(b) second valve means operable between first and second positions and operative in said first position to connect said fluid pressure source to the rear of said piston for driving it through its forward stroke.

4. The fluid-operated tool of claim 3 wherein:
(a) said second valve means is operative in said second position to connect said fluid pressure source to the front of said piston for driving it through its return stroke.

5. The fluid-operated tool of claim 3 including:
(a) valve control means to move said second valve means to its second position in response to the rotary motor reaching the end of its forward stroke.

6. The fluid-operated tool of claim 5 wherein:
(a) said valve control means is operative, in response to a momentary exhausting of said fluid pressure source, to move said second valve from its second position to its first position whereby said tool can be recycled merely by momentarily exhausting a fluid pressure line serving as said source.

7. A fluid-operated tool for rotating and axially reciprocating a tool implement, said tool comprising:
(a) a tool body;
(b) a rotary motor mounted in said body for axial reciprocating movements therein;
(c) a tool spindle connected to said rotary motor for rotation therewith;
(d) fluid-operated feed means in said body for reciprocating said rotary motor from its rearward starting position through a cycle consisting of a forward feed stroke and followed by a return stroke to its starting position;
(e) a fluid pressure source connected to said tool body; and
(f) feed valve means in said body and operative, in response to a momentary drop in pressure of said fluid pressure source, to cause said feed means to reciprocate said rotary motor and its spindle through a single cycle and then stop at said starting position.

8. A fluid-operated tool for rotating and axially reciprocating a tool implement, said tool comprising:
(a) a tool body;
(b) a piston slidably mounted in said body for axial reciprocating movements therein and carrying a fluid-operated motor and a spindle on its front end;
(c) means for reciprocating said piston in said body from its rearmost starting position through a cycle consisting of a forward feed stroke followed by a return stroke to its starting position;
(d) a passageway extending through said tool body and said piston for feeding fluid pressure to said motor; and
(e) a motor valve carried by said piston, said motor valve being operative in said starting position to close said passageway and bar said fluid pressure from said motor and also being operative, in response to the piston beginning its forward stroke, to open said passageway to allow the fluid pressure to flow to and operate said motor.

9. The fluid-operated tool of claim 8 wherein:
(a) said motor valve continues to keep said passageway open throughout the remainder of the tool cycle and only closes the passageway upon the return of the piston to its rear starting position.

10. The fluid-operated tool of claim 9 wherein:
(a) said passageway includes a tube extending forwardly through said piston;
(b) said piston being hollow and slidably riding on said tube;
(c) a hollow piston rod interconnecting said piston and said motor; and
(d) said motor valve is mounted inside of said piston rod to seat on and close the front end of said tube as said piston reaches its rear starting position.

11. A fluid-operated tool for rotating and axially reciprocating a tool implement, said tool comprising:
(a) body;
(b) a fluid-operated piston slidably mounted in said body for axial reciprocating movements and carrying on its front end a rotary motor and a tool spindle;
(c) valve means in said body movable between alternate positions, said valve means being operative, in a first position, to feed fluid pressure from a fluid pressure source to the rear face of said piston to cause it to move forwardly along a forward feed stroke and also being operative, in a second position to exhaust fluid pressure from the rear face of said piston to allow it to make its return stroke; and
(d) valve operating means operative, in response to a drop in pressure of said fluid pressure source, to move said valve means from said second position to said first position, to cause said piston to begin another forward feed stroke.

12. The fluid-operated tool of claim 11 wherein:
(a) said fluid pressure source is connected to the valve means by a three-way valve and a single hose; and
(b) said three-way valve is operative, in alternate positions, to admit fluid pressure to said hose and to exhaust the hose.

13. The fluid-operated tool of claim 11 wherein said valve means includes:
(a) a spool valve slidable in a bore in said body and having first and second chambers at its opposite ends;
(b) a spring normally biasing said spool valve to its first position and toward its first chamber;
(c) passage means for admitting fluid pressure to both chambers so that said spool valve remains in said first position; and
(d) means operative, in response to the arrival of said piston at the forward end of its forward stroke, to exhaust fluid pressure from said second chamber to cause the pressure in said first chamber to drive said spool valve to its second position, and also cause said piston to start its return stroke, said spool valve being moved back to its first position merely by exhausting the fluid pressure in said first chamber.

14. The fluid-operated tool of claim 13 wherein:
(a) said first chamber can be exhausted simply by exhausting the main fluid pressure line feeding the tool.

15. The fluid-operated tool of claim 13 wherein:
(a) said spool valve is operative in its second position to feed fluid pressure to the front face of said piston and to exhaust fluid pressure from the rear face of said piston.

16. The fluid-operated tool of claim 13 wherein:
(a) said rotary motor carried by said piston is fluid-operated and driven by the same fluid that drives said piston;
(b) a passageway extending through said body and said piston for feeding fluid pressure to said rotary motor; and
(c) a motor valve carried by said piston and adapted to close said passageway when said piston reaches the rear end of its travel, said motor valve leaving said passageway open in all other positions of said piston.

17. The fluid-operated tool of claim 13 including:
(a) means for moving said spool valve back to its first position by feeding fluid pressure to said second chamber to counterbalance the fluid pressure in said first chamber.

18. The fluid-operated tool of claim 11 including:
(a) first limiting means for adjustably restricting the fluid being fed to the rear face of said piston for controlling and varying the speed of the forward feed stroke; and
(b) second limiting means, separate from said first limiting means, for adjustably limiting the fluid being exhausted from the rear face of said piston for controlling and varying the speed of the return stroke.

References Cited by the Examiner

UNITED STATES PATENTS

| 1,425,613 | 8/1922 | Stage | 173—19 |
| 2,607,197 | 8/1952 | Johnson | 77—33.5 |
| 2,674,098 | 4/1954 | Taylor | 173—155 |
| 3,055,343 | 9/1962 | Kurt | 173—152 |

FRED C. MATTERN, JR., *Primary Examiner.*
MILTON KAUFMAN, *Examiner.*
L. P. KESSLER, *Assistant Examiner.*